United States Patent
Cyr et al.

(12) United States Patent (10) Patent No.: US 8,161,539 B2
Cyr et al. (45) Date of Patent: Apr. 17, 2012

(54) IPSEC NETWORK ADAPTER VERIFIER

(75) Inventors: Michael Paul Cyr, Georgetown, TX (US); Gerald Francis McBrearty, Austin, TX (US); Shawn Patrick Mullen, Buda, TX (US); Johnny Meng-Han Shieh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2294 days.

(21) Appl. No.: 10/127,064

(22) Filed: Apr. 19, 2002

(65) Prior Publication Data
US 2003/0200456 A1 Oct. 23, 2003

(51) Int. Cl.
*G06F 9/00* (2006.01)
*G06F 15/16* (2006.01)
*G06F 17/00* (2006.01)
*H04L 29/06* (2006.01)

(52) U.S. Cl. ............... 726/13; 726/3; 726/14; 713/153

(58) Field of Classification Search .......... 726/3, 13, 726/14; 713/153
See application file for complete search history.

(56) References Cited

U.S. PATENT DOCUMENTS

| | | | |
|---|---|---|---|
| 4,091,423 A | 5/1978 | Branscome | |
| 5,596,575 A * | 1/1997 | Yang et al. | 370/468 |
| 5,812,763 A | 9/1998 | Teng | |
| 6,009,528 A * | 12/1999 | Teraoka | 726/22 |
| 6,115,376 A * | 9/2000 | Sherer et al. | 370/389 |
| 6,219,420 B1 | 4/2001 | Hardy et al. | |
| 6,253,321 B1 * | 6/2001 | Nikander et al. | 713/160 |
| 6,754,854 B2 * | 6/2004 | Kurrasch | 714/47 |
| 2003/0185220 A1 * | 10/2003 | Valenci | 370/398 |

* cited by examiner

*Primary Examiner* — William Powers
(74) *Attorney, Agent, or Firm* — Yudell Isidore Ng Russell PLLC

(57) ABSTRACT

A data processing system that supports verifiable IPSec network communication. The data processing system comprises an IPSec network adapter that connects the data processing system to an external network and provides IPSec encryption and routing of IPSec packets. The data processing system also comprises a network adapter verifier, which is a secondary network card that is utilized to verify that IPSec packets being transmitted to the external network by the IPSec network adapter have been encrypted. The network adapter verifier comprises a device driver, which caches a copy of an IP address from a generated IPSec packet prior to the packet being received by the network adapter. The network adapter verifier is connected to the external network and monitors the transmission of packets out to the network connection by the network adapter. The IP identification (ID) of the packets are compared to the captured IP address of the generated IPSec packet. When the IP address of the transmitted packet is not the same as that of the generated/cached IP address, the network adapter has failed to correctly encode the packet according to IPSec, and the transmission is thus not secure. The transmission of the stream of packets is therefore terminated.

17 Claims, 5 Drawing Sheets

IPSEC NETWORK ADAPTER VERIFIER

BACKGROUND OF THE INVENTION

1. Technical Field

The present invention relates generally to computer systems and in particular to network communication components of computer systems. Still more particularly, the present invention relates to a method and system for verifying correct operation of a network adapter within a computer system.

2. Description of the Related Art

One recent development in Internet Protocol (IP) communication technology is IP Security protocol (IPSec). IPSec is a security addition to the IP protocol that enables security and privacy to TCP/IP communication. IPSec is a suite of protocols that seamlessly integrates security features, such as authentication, integrity, and confidentiality into IP. Using the IPSec protocols, an encrypted or authenticated path can be created between two peers (or Policy Enforcement Points) utilizing Internet Key Exchange (IKE). Each peer is a device, such as a client, router, or firewall, that serves as an endpoint for the tunnel.

IPSec is typically used in a gateway-to-gateway configuration (although a client-to-gateway configuration may also be utilized). Accordingly, all traffic between gateways rides in a virtual "tunnel," which both verifies the authenticity of the sender and the receiver and encrypts all data traffic (e.g., packets). IPSec typically encodes identification (ID) information (e.g., local and remote IDs-IP addresses, tunnel endpoints, etc.) in the IPSec packet during the IKE negotiation and data transfer.

Implementation of IPSec in a gateway/terminal requires an IPSec adapter and corresponding software-based device driver. Typically, the gateway/terminal is a computer system with a processor and memory, and the device driver is stored within memory and executed by the processor (in concert with the OS) to control the hardware configured IPSec adapter. The IPSec adapter (or adapter card) has a direct (or indirect) connection to the external network on which the destination gateway/terminal is located.

IPSec chip sets are now available and are provided as a component part of most network adapters. Although the IPSec operations are performed on the network adapter in a "bump-in-the-stack" mode, the adapter must still be dynamically configured. The IPSec adapter must be told by its corresponding device driver how to handle particular Security Associations (SA).

For example, referring briefly to FIG. 6, hostC has a Security Association (SA) with two remote hosts, hostA and hostB, to which hostC connects via wide area network 609, such as the Internet. The IPSec adapter of hostC is told by the device driver to encrypt data that has hostA as its destination with Data Encryption Standard (DES) and secret key "qwerty". The IPSec adapter is also told by the device driver to encrypt data that has hostB as its destination with triple-DES and secret key "bluesky".

IPSec adapters typically operate according to the control information received from the device driver. Occasionally, however, the network adapter and the device driver become out-of-sync and the network adapter fails to encrypt or correctly encrypt data being transmitted. Unfortunately, with IPSec chips placed on the network card, occurrence of such errors are silent and SA information is dropped without hostC being made aware that it is transmitting un-encrypted data (typically clear text). Of course, this may lead to a variety of other problems.

A particular IPSec card may hold/support up to 16 SAs. If the device driver and the adapter become out of sync, the device driver may send an outbound IP packet to the adapter thinking the adapter will match this packet to one of the 16 SA and perform the IPSec encryption. If the adapter does not match this outbound packet, the adapter will send the packet out on the network in clear text. The adapter does not report this as an error, since a large amount of network traffic is sent and received in clear text.

The difficulty in addressing this problem is primarily due to the fact that once the outbound packet is sent to the adapter, the device driver must trust that the card is configured correctly and will do the necessary encryption. With the current design model, an IPSec layer (kernext) examines the outbound packet and, if kernext feels that the correct SA is in place on the IPSec network adapter, kernext sends the packet to the device driver in clear text expecting the adapter should recognize the packet and perform the IPSec encryption on the packet before sending it out. However, kernext has no way of knowing whether the adapter's encryption of the packet undertaken completed successfully.

A user/administrator may attempt to verify that the packets are being encrypted by tapping into the network stream and physically observing the packets being transmitted within a SA. The user may then have to physically stop the transmission and restart the process. Currently, there is no efficient way to verify that the adapter is performing the desired encryption. There is also no way to dynamically restart a transmission process once a determination is made to terminate a transmission due to the above described errors.

The present invention therefore realizes that it would be desirable to provide a method and IPSec hardware component that dynamically verifies that packets being transmitted by the network adapter are correctly encrypted prior to transmission on the network. A method and computer program product that enables an IPSec hardware component to track packets to be encrypted by the IPSec adapter to ensure that such encryption is occurring would be a welcomed improvement. These and other benefits are provided by the invention described herein.

SUMMARY OF THE INVENTION

Disclosed is a data processing system that supports IPSec network communication. The data processing system comprises an IPSec network adapter that connects the data processing system to an external network and provides IPSec encryption and routing of IPSec packets. The packets are generated by a software coded device driver of the network adapter, which executes on the processor in conjunction with the operating system of the data processing system. The data processing system also comprises a network adapter verifier, which is a secondary network card that is utilized to verify that IPSec packets being transmitted to the external network by the IPSec network adapter have been encrypted.

The network adapter verifier comprises a device driver, which directs the copying of an IP address from a generated IPSec packet prior to the packet being received by the network adapter. The copied IP addresses are cached for later use during verification. The network adapter verifier has a connection to the external network and monitors the transmission of packets out to the network connection by the network adapter. The IP identification (ID) of the packets are compared to the copied IP address of the generated IPSec packet. Those packets whose IP ID matches a copied IP address are then checked to see if they were encrypted. Depending on the type of encryption process utilized by the network adapter, the verifier checks the packet for an indicia associated with the encryption process. When the indicia is not present within the packet, the network adapter has failed to correctly encode the packet according to IPSec, and the transmission is thus not secure. The transmission of the stream of packets is therefore terminated. The copied IP addresses are deleted from the cache once the comparison for that particular IPSec packet is completed.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

DETAILED DESCRIPTION OF AN
ILLUSTRATIVE EMBODIMENT

Figure 1:
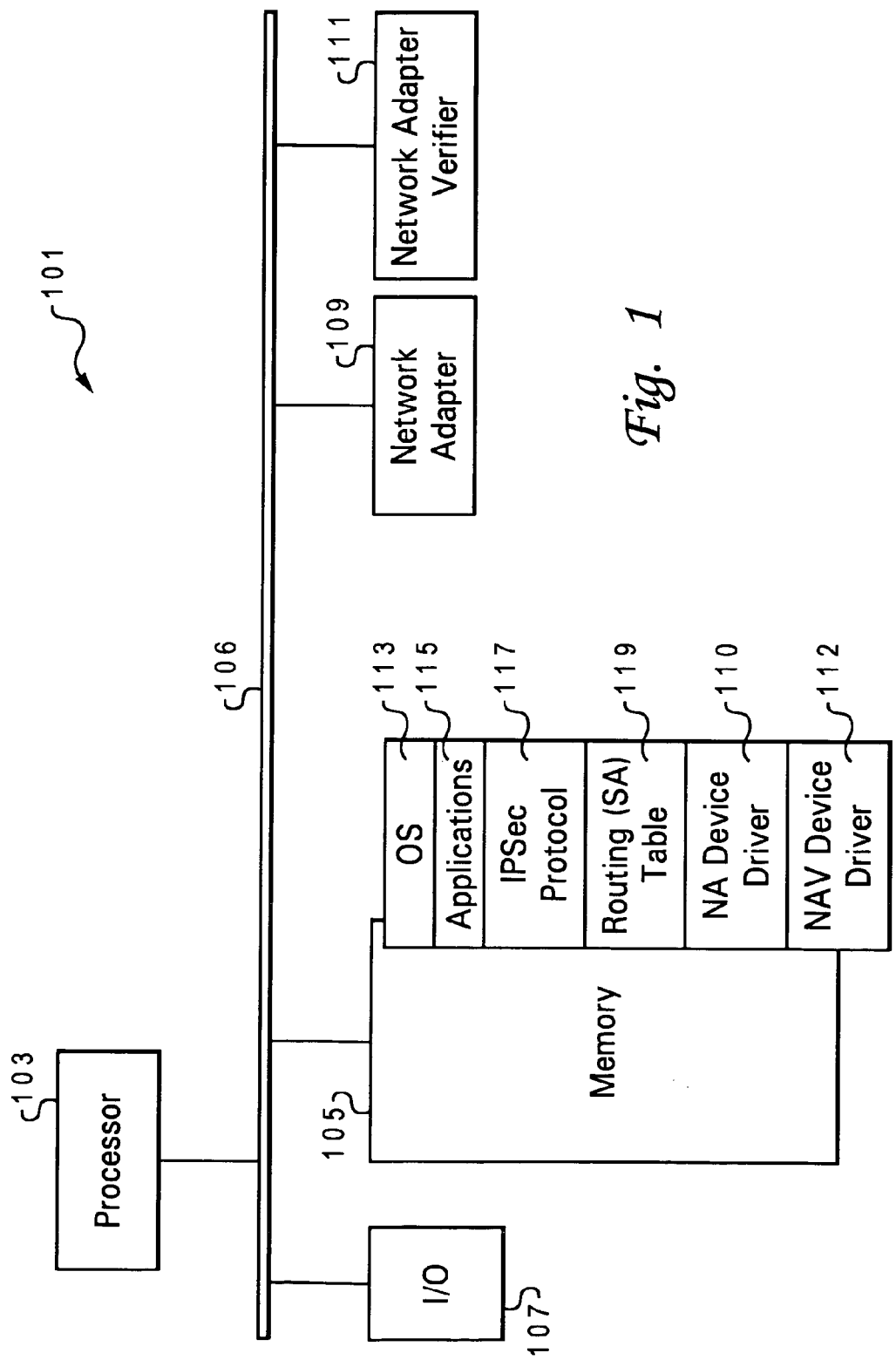
FIG. 1 is a block diagram representation of a data processing system within which the features of the present invention may be advantageously implemented.

Referring now to the figures, and in particular with reference to FIG. 1, there is illustrated a simplified configuration of a data processing system within which the features of the invention may be advantageously implemented. Data processing system 101 comprises processor 103, memory 105, Input/Output (I/O) components 107, and all coupled via interconnect 106. Data processing system 101 also comprises IPSec network adapter 109 and, according to the illustrated embodiment of the invention, a network adapter verifier 111. Functional features of network adapter 109 and network adapter verifier 111 are described below. Notably, network adapter 109 is utilized to connect data processing system 101 to an external network (not shown).

Data processing system 101 further comprises operating system (OS) 113 and program applications 115 stored on memory 105 and executed by processor 103. Additionally, software coded components of IPSec protocol 117 and routing table 119 are stored on memory 105. In order to properly operate, network adapter 109 and network adapter verifier 111 both have associated device drivers, which are illustrated as modules 110 and 112 within memory 105. Device drivers are software coded components that control the operation of the corresponding hardware. The network adapter and network adapter verifier device drivers 110 and, 112 are interfaced with OS 113 and executed within the processor to provide access to and/or control of network adapter 109 and network adapter verifier 111, respectively. Data packets utilized by the device drivers 110 and 112 typically originate from applications 115 running on processor 103. In the disclosed embodiment, network adapter device driver 110 operates similarly to standard IPSec device drivers, although other non-standard operation is possible. For purposes of the invention, any type of network adapter and associated device driver may be utilized so long as they support IPSec protocol and functionality associated therewith. Preferably, network adapter 109 implements IPSec security encryption of packets received from adapter device driver 110 according to IPSec protocol. Notably, data processing system 101 may also comprise separate/additional hardware and software components that receive packets via IPSec and/or other protocols.

The various features of the invention are described with particular reference to data processing system 101 and IP network 301 (of FIG. 3) and illustrated components. It is understood, however, that the specific descriptions provided herein are done so for illustrative purposes only and not mean to be limiting on the invention. Other more complex (or even simpler) processing systems and/or network configurations are possible and fall within the scope of the invention. Key to the invention, however, is that data processing system 101, irrespective of the configuration of its other components, comprises a network adapter and device driver that supports IPSec protocol communication, and a network adapter verifier 111 having the functional characteristics described herein. The invention may in fact be completed within a dumb terminal, utilized solely for network communications. As utilized herein the word terminal refers to any system that is connected to a network, can receive and transmit network level communication, and has an affiliated network address by which a communication path is directed. Terminal may be utilized interchangeably with gateway, data processing system, etc., throughout the description of the invention.

Figure 2:
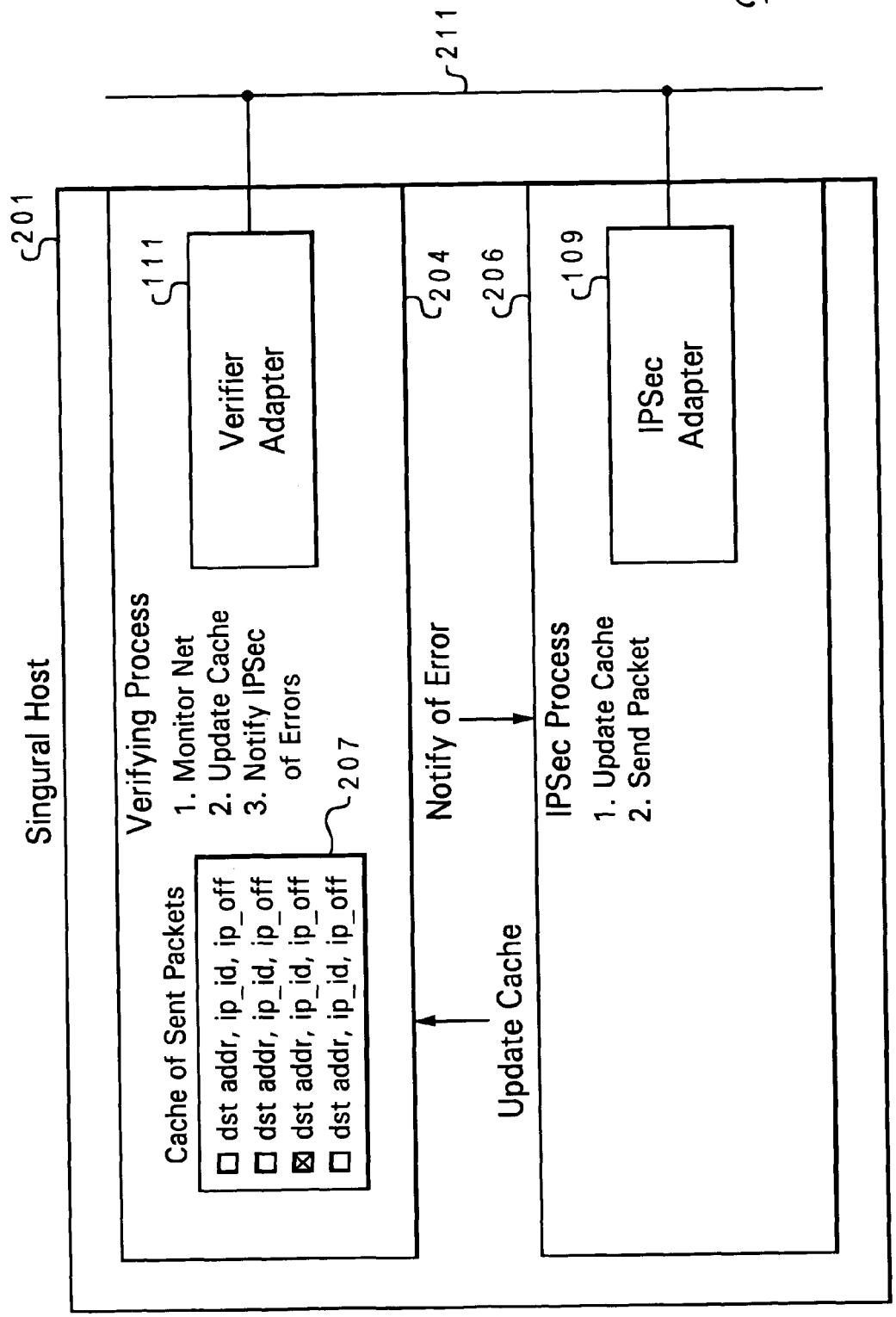
FIG. 2 is a block diagram representation of a singular host machine with both an IPSec adapter and a network adapter verifier in accordance with one embodiment of the invention.

FIG. 2 illustrates a diagram of an IPSec network adapter 109 and adapter verifier 111 as operated within a host system. As shown, singular host 201, comprises two adapters, verifier adapter (or network adapter verifier) 111 and IPSec adapter 109, which each provide and/or support particular processes. These processes are verifying process 204 and IPSec process 206. Both adapters 109 and 111 are illustrated connected to an external network (not shown) via interconnect 211. Verifying process 204 contains a cache of IP IDs 207 of sent IPSec packets. The features of the verifying process are listed therein and includes: monitoring the network, updating the cache, and notifying the executing IPSec communication process of errors. The error notification is passed to the IPSec process 206, which is responsible for updating the cache 207 and sending out data packets for transmission.

The illustrative singular host 201 depicts the verifier adapter 111 and network adapter 109 within a single block. It is contemplated that both adapters will be separate components, each on an individual chip. Both components may be packaged together (i.e., on the same chip) and thus provide a robust/automatic verification component for the network adapter and enhanced IPSec security. When packaged together, a single device driver may be provided to complete both IPSec network adapter and network adapter verification processes. When provided as separate components, a user may install the verifier adapter after the network adapter. Several of the operations of network adapter verifier 111 are controlled by verifier device driver 112, which is software coded algorithms that are executed on processor 103.

It is contemplated that the verifier adapter 111 may be connected to one of the slots available within the computer for connecting network cards. It is further contemplated that installation of the device driver for the network verifier will necessarily update the device driver of the network adapter 109 to support the verification processes such as updating the cache with required IPSec ID information. Various configurations are possible and the present description is not intended to be an exhaustive list of the possibilities. Any configuration, which provides the dynamic verification of the IPSec network adapter 109 during packet transmission fall within the scope of the invention.

Figure 3:
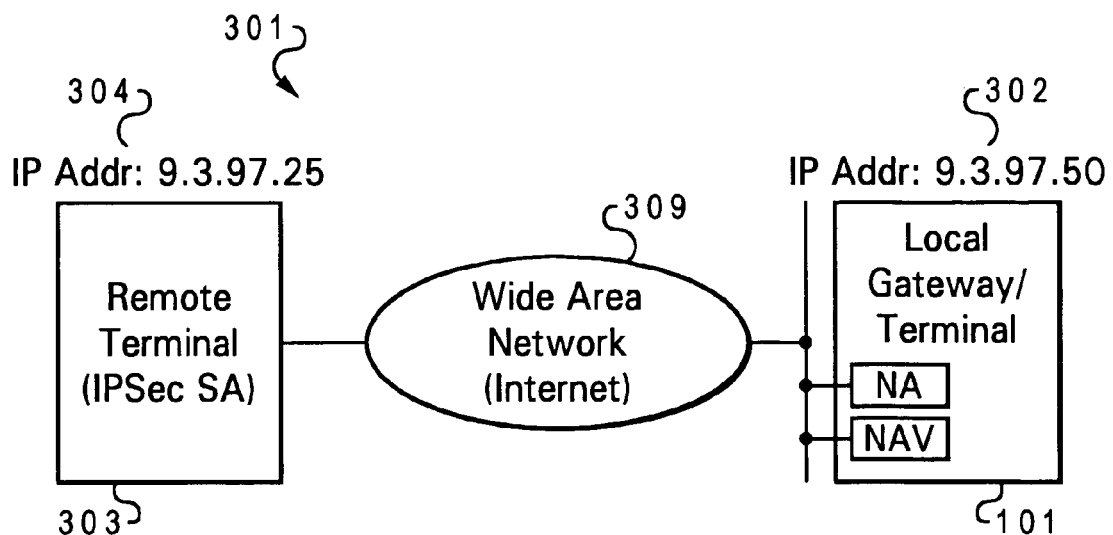
FIG. 3 illustrates a basic IP network within which IPSec-based transmissions may be completed and verified in accordance with the features of the present invention.
Figure 6:
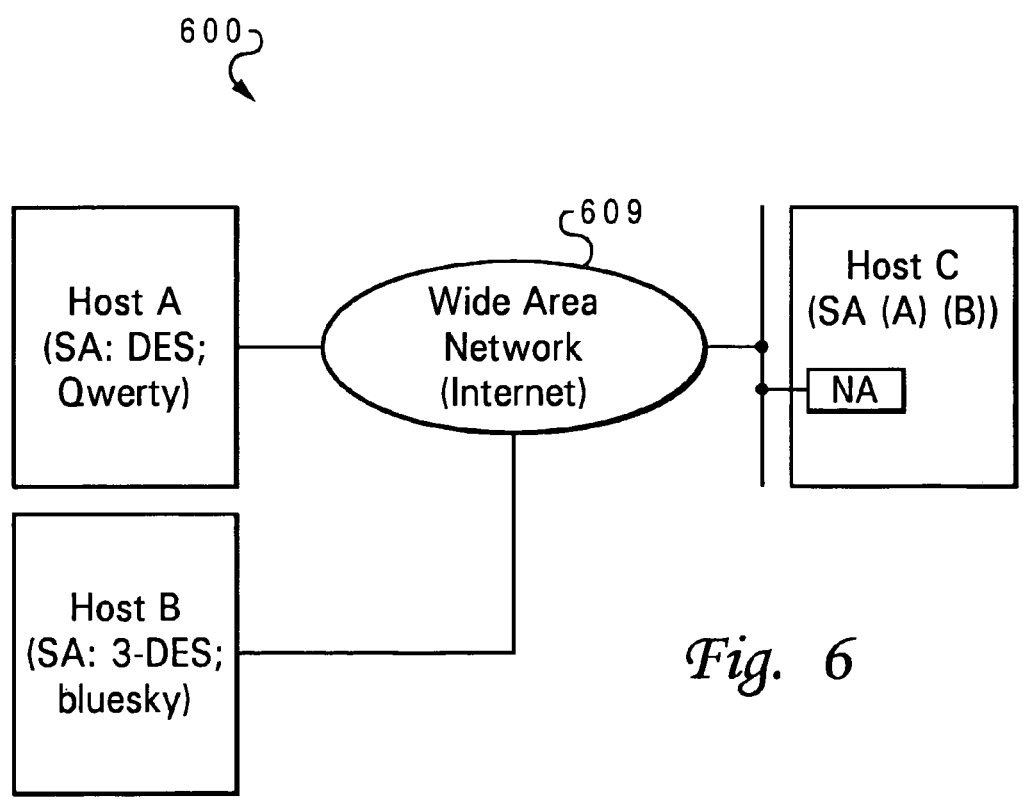
FIG. 6 is a block diagram of a sample network with security associations (SA) utilized to illustrate a prior art operation of the IPSec network adapter.

FIG. 3 illustrates a block diagram of an IP network with at least one data processing system with the functional hardware and software components described above in FIGS. 1 and 2. IP network 301 comprises at least one remote terminal 303 connected to a local gateway, i.e., data processing system 101 (or singular host 201), via a wide area network (WAN) 309, such as the Internet. For simplicity, all future references to the wide area network 309 will be referred to as Internet 309 and local gateway is assumed to be synonymous with data processing system 101 and referenced accordingly. Local gateway 101 is similarly configured to that described above and connects to WAN 309 via IPSec network adapter 109. Each component within IP network 301 has a unique IP address. As illustrated, local gateway 101 has IP address 302, and remote terminal 303 also has an associated IP address 304. References to a packet transmission herein mean a transmission originating at local gateway 101 and terminating at remote terminal 303, transmitted via WAN 309 within a Security Association (SA). Thus, network adapter verifier 111 of local gateway 101 monitors WAN 309 for the packets issued on WAN 309 by network adapter of local gateway 101.

The invention provides an IPSec Network Adapter Verifier with specific functionality for verifying that a network adapter is operating correctly during IPSec packet transmission. Specifically, the invention provides a data processing system 101 that supports IPSec network communication. The data processing system 101 comprises an IPSec network adapter 109 that connects the data processing system 101 to an external network and provides IPSec encryption and routing of IPSec packets. The packets are generated by a software coded device driver of the network adapter 109, which executes on the processor in conjunction with the operating system of the data processing system 101. The data processing system also comprises a network adapter verifier, which is a secondary network card that is utilized to verify that IPSec packets being transmitted to the external network by the IPSec network adapter have been encrypted.

The network adapter verifier comprises a device driver, which directs the copying of an IP address from a generated IPSec packet prior to the packet being received by the network adapter. The copied IP addresses are cached for later use during verification. The network adapter verifier has a connection to the external network and monitors the transmission of packets out to the network connection by the network adapter. The IP identification (ID) of the packets are compared to the copied IP address of the generated IPSec packet. Those packets whose IP ID matches a copied IP address are then checked to see if they were encrypted. Depending on the type of encryption process utilized by the network adapter, the verifier checks the packet for an indicia associated with the encryption process. When the indicia is not present within the packet, the network adapter has failed to correctly encode the packet according to IPSec, and the transmission is thus not secure. The transmission of the stream of packets is therefore halted (i.e., the adapter stops sending out the packets and the remaining packets that have been created are discarded). The copied IP addresses are deleted from the cache once the comparison for that particular IPSec packet is completed. A new transmission may be started following the discarding of the created packets, subject to the same verification process.

When a packet is encrypted, the packet is provided with some indication (referred to herein as an "indicia") of the encryption. The actual indicia (which is an observable characteristic of the encrypted packet) depends on the type of encryption process being carried out by the network adapter, and this may be specified by the network adapter driver. For example, IKE encryption may be utilized and may generate the IPSec (SA) addresses, which are encoded (or placed) within the packet's load (i.e., the data segment and not the header). In other encryption processes, the indicia may be recognized as a change within the IP header of the packet, including generation of specific authentication headers or encapsulated headers in clear text according to IETF (Internet Engineering Task Force) definitions. The actual encryption process is not of major import so long as the network verifier and verifier driver are aware of what indicia the network verifier is checking for.

Thus, when an IPSec packet is monitored on the network, the adapter verifier checks the packet for the particular indicia. When the snooped IPSec packet contains the indicia, which is generated at IPSec encryption time, the network adapter is operating correctly. When the packet does not contain the indicia, the network adapter is not operating correctly (i.e., not encrypting (or correctly encrypting) the packets before transmission to the network). The packet is thus being transmitted in clear (i.e., un-encrypted) text or is not properly encrypted according to the encryption scheme being implemented by the terminal. Since the verifier catches the error on the first packet missing the indicia and causes the transmission of other packets to be immediately stopped, very little information is issued to the network without correct IPSec encryption.

Figure 4A:
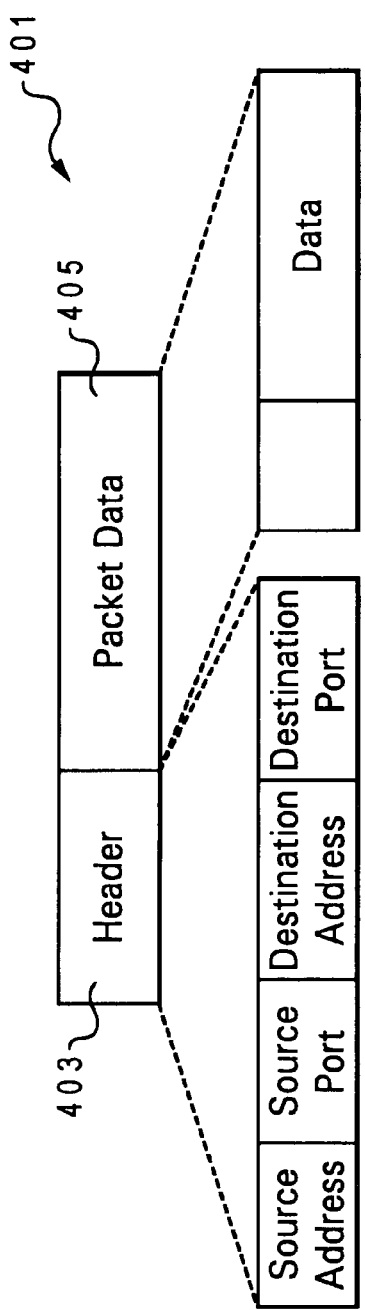
FIGS. 4A and 4B illustrate sample IPSec packets with header information and IPSec addresses, respectively, utilized for the comparison by the adapter verifier in accordance with one embodiment of the present invention.
Figure 4B:
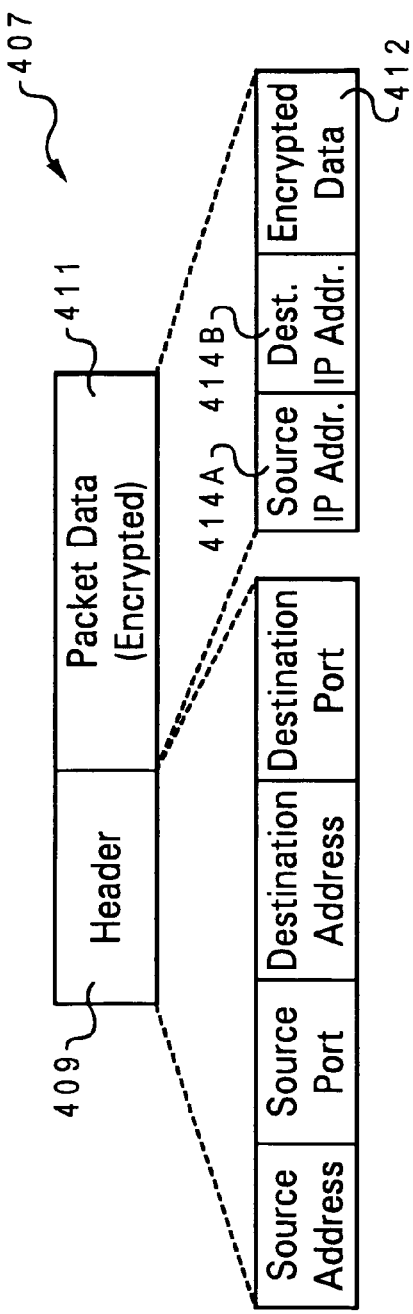

FIGS. 4A and 4B illustrates one embodiment of a sample IPSec packet before encryption 401 and IPSec encrypted packet 407, respectively. As shown, packet 401 includes header 403 and packet data 405, while packet 407 includes header 409 and encrypted packet data 411. Headers 403 and 409 contains the IP addresses. Encrypted packet data 411 comprises the encrypted data 412 as well as the IPSec IDs 414A, 414B. Encrypted packet data 411 of packet 407 is generated by IKE and IPSec protocol within network adapter. In accordance with this embodiment, IPSec IDs 414A, 414B are generated during the encryption process. The network adapter verifier thus monitors the IPSec packets for these IPSec IDs and may even compare the IPSec IDs to the IPSec IDs within its SA table 119.

Figure 5:
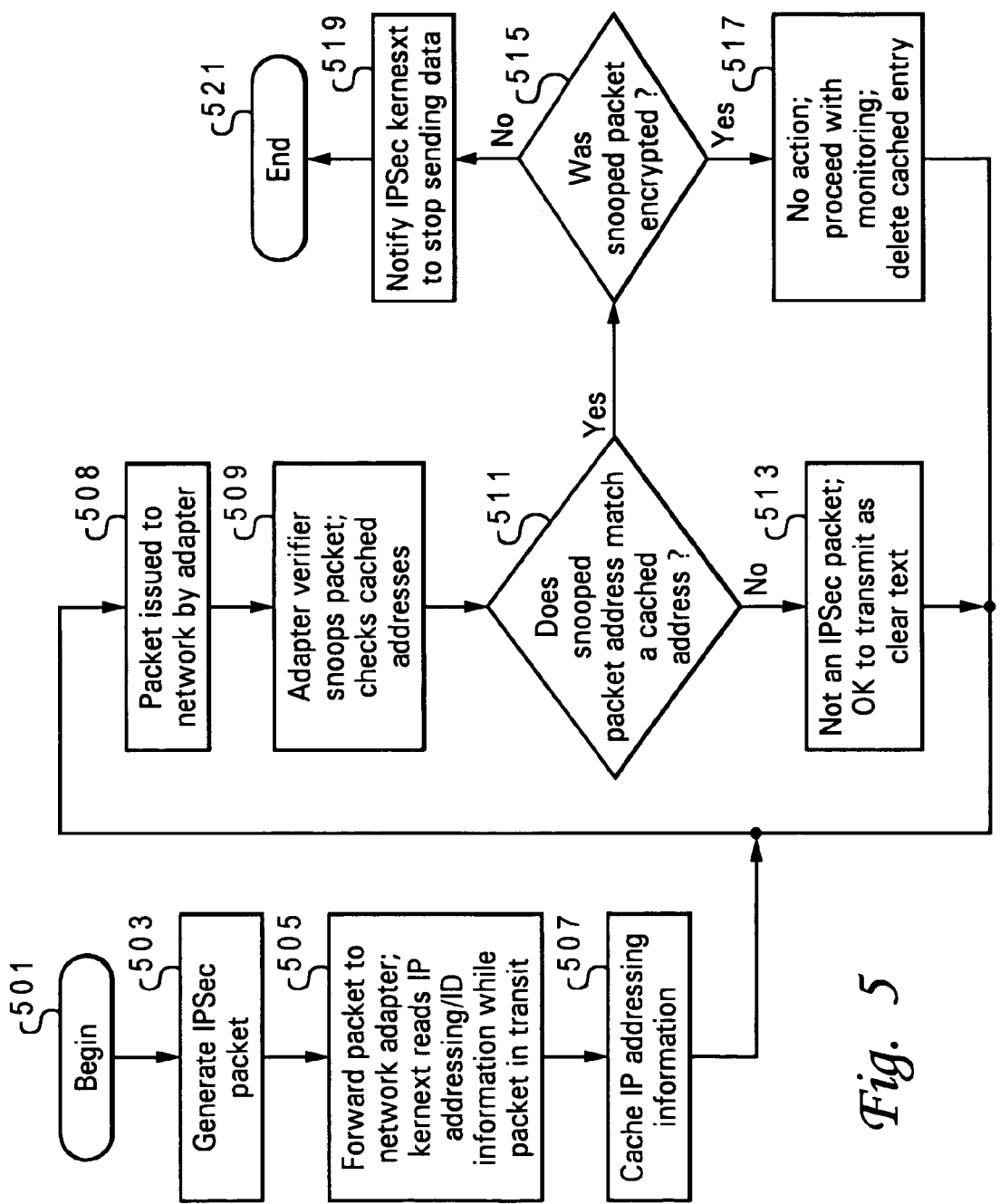
FIG. 5 is a flow chart depicting the process of verifying the operation of an IPSec network adapter according to one embodiment of the invention.

FIG. 5 is a flow chart illustrating the process by which verification of the adapter is completed. The process begins at block 501, and thereafter proceeds to block 503, which illustrates a packet being generated by the software running on the processor (with IP or other communication protocol implemented via the device driver and OS). The packet is forwarded to the network adapter. As the packet is in transition to the network adapter (or while the packet is being generated), the IPSec kernext reads the IP addressing or identification (ID) information of the outbound packets before sending the packet to the network adapter as shown at block 505. The IPSec kernext caches the IP ID information in the table of the network adapter verifier as indicated at block 507. The packet is then issued to the network by the adapter, as shown at block 508. The second network adapter (i.e., a network adapter verifier) is programmed to snoop for these IPSec network packets on the terminal's network connection. Thus, as depicted at block 509, the adapter verifier snoops a network packet and matches the IP ID information therein to the cached IP ID information from the outbound packets.

A determination is made at block 511 whether the packet identifier (ID) of the snooped packet is found in the cache. If the packet ID is not in the cache, the packet was supposed to be sent in clear (un-coded) text, so no change or adjustment is required to the network adapter as indicated at block 513. If, however, the packet ID is found within the cache, a next determination is made at block 515, whether the encryption indicia is found within the packet (i.e., whether the snooped packet was in fact encrypted). Thus, following the snoop and comparison of the cache information, the processor alerts the device driver to carry out one of three possible actions. When the snooped network packet contains the encryption indicia, which is generated at IPSec encryption time, the network adapter is operating correctly. No action is taken on the data stream, and the cached entry is deleted as shown at block 517. When the packet does not contain the encryption indicia, this indicates that the data is leaving in clear (i.e., un-encrypted) text. The IPSec kernext is notified to stop sending data as indicated at block 519 because the transmission is not secure. Then the process ends as shown at block 521.

Notably, in one embodiment, the IPSec kernext triggers the device driver to execute necessary IPSec steps to re-establish the SA, sync the network adapter, and re-initiate the start of IPSec data packet transmission. Since the adapter verifier is always monitoring the network, very little data that should be encrypted gets transmitted in clear text. The process of re-initiating the transfer of data packets may be timed (e.g., re-start in 10 seconds) and/or capped (e.g., re-try only 5 times). Of course, the invention contemplates a signaling mechanism to alert the user when/if the network adapter is not providing IPSec transmissions on a regular basis. Thus, the user is able to manually replace the network adapter, update the device driver, or complete any other step required to ensure that future IPSec transmissions are in fact properly encrypted by the network adapter.

As a final matter, it is important that while an illustrative embodiment of the present invention has been, and will continue to be, described in the context of a fully functional data processing system, those skilled in the art will appreciate that the software aspects of an illustrative embodiment of the present invention are capable of being distributed as a program product in a variety of forms, and that an illustrative embodiment of the present invention applies equally regardless of the particular type of signal bearing medium used to actually carry out the distribution. Examples of signal bearing media include recordable media such as floppy disks, hard disk drives, CD-ROMs, and transmission media such as digital and analog communication links.

Although the invention has been described with reference to specific embodiments, this description should not be construed in a limiting sense. Various modifications of the disclosed embodiments, as well as alternative embodiments of the invention, will become apparent to persons skilled in the art upon reference to the description of the invention. It is therefore contemplated that such modifications can be made without departing from the spirit or scope of the present invention as defined in the appended claims.

What is claimed is:

1. A network terminal comprising:
a network adapter that interfaces with a network, and wherein the network adapter:
receives, from a network adapter driver, a first received packet comprising a packet identifier (ID) including an internet protocol (IP) address,
encrypts the first received packet based on an encryption protocol to obtain an encrypted packet comprising the packet ID and an encryption indicia that is an identifier for the encryption protocol;
generates a stream of packets, wherein a first packet in the stream of packets comprises the encrypted packet; and
transmits the stream of packets out to an interface of said network; and
a network adapter verifier that is separate from said network adapter, and wherein the network adapter verifier:
prior to the first received packet being received by the network adapter, captures said packet ID;
caches said packet ID to obtain a first cached packet ID;
in response to the network adapter transmitting the stream of packets, monitors said transmission of the stream of packets out to the interface of said network by the network adapter;
in response to the network adapter sending the transmission, compares a first packet ID of the first packet in said stream of packets to the first cached packet ID to determine whether there is a match;
in response to said first packet ID matching said first cached packet ID, checks said first packet for said encryption indicia; and
in response to a determination that said first packet does not contain said encryption indicia:
halts the transmission of said stream of packets;
discards one or more subsequent packets in said stream of packets; and
wherein said determination that said first packet does not contain said encryption indicia provides an indication that the network adapter is not operating correctly.

2. The network terminal of claim 1, further comprising:
software coded algorithms executing within the terminal that provide Internet Protocol Security (IPSec) handling of specific packets of said transmission, wherein said specific packets are encrypted prior to being issued to said interface by said network adapter.

3. The network terminal of claim 2, wherein the network adapter verifier halting the sending of the transmission further comprises:
the network adapter verifier implements a response that prevents further transmission of one or more specific packets in said stream by said network adapter without first encrypting said one or more specific packets.

4. The network terminal of claim 3, wherein said response includes:
stopping said transmission;
re-formatting said network adapter according to said encryption protocol; and
re-initiating a transmission of said specific packets via said network adapter.

5. The network terminal of claim 2, wherein said software coded algorithms includes the network adapter driver for interfacing with said network adapter.

6. The network terminal of claim 1, wherein said encryption protocol is said IPSec protocol, said components are IPSec packets, and said encryption indicia indicates to said network adapter verifier that a packet issued on said interface has been encrypted according to said IPSec protocol.

7. The network terminal of claim 1, said network adapter verifier further:
tracks a number of occurrences when specific packets issued on said interface did not exhibit said encryption indicia; and
issues a signaling alert when said number of occurrences reaches a predetermined threshold.

8. The network terminal of claim 1, wherein said terminal is a data processing system.

9. The network terminal of claim 1, further comprising a connection to other terminals which together create said network having at least one destination terminal along with said network terminal.

10. A method for verifying one or more individual packets being transmitted from a network terminal out to an interface of a network, said method comprising:
a network adapter receiving, from a network adapter driver, a first received packet comprising a packet identifier (ID) including an internet protocol (IP) address;
the network adapter encrypting the first received packet based on an encryption protocol to obtain an encrypted packet comprising the packet ID and an encryption indicia that is an identifier for the encryption protocol;
the network adapter generating a stream of packets, wherein a first packet in the stream of packets comprises the encrypted packet;
prior to the first received packet being received by the network adapter, a network adapter verifier, that is separate from said network adapter, capturing said packet ID;
said network adapter verifier caching said packet ID to obtain a first cached packet ID;
said network adapter transmitting out to an interface of said network, wherein said transmission includes said stream of packets; and
in response to said network adapter transmitting the stream of packets, said network adapter verifier:
monitoring said transmission of the stream of packets out to the interface of said network by the network adapter;
comparing a first packet ID of the first packet in said stream of packets to the first cached packet ID to determine whether there is a match;
in response to first packet ID matching said first cached packet ID, checking said first packet for said encryption indicia; and
in response to a determination that said first packet does not contain said encryption indicia:
halting the transmission of said stream of packets;
discarding one or more subsequent packets in said stream of packets; and
wherein said determination that said first packet does not contain said encryption indicia indicates that the network adapter is not operating correctly.

11. The method of claim 10, further comprising:
generating said first received packet from application data; and
placing said packet ID within a header of said first received packet when said first received packet is created according to said encryption protocol, wherein other packets that are not created according to said encryption protocol are provided with a different identifier-type.

12. The method of claim 10, further comprising:
tracking a number of occurrences when one or more individual packets issued on said interface did not exhibit said encryption indicia; and
issuing a signaling alert when said number of occurrences reaches a predetermined threshold.

13. The method of claim 10, wherein:
said encryption protocol is an Internet Protocol Security (IPSec) protocol;
said first received packet is an IPSec packet;
said encryption indicia is a characteristic that identifies when a packet has been encrypted according to the IPSec protocol prior to its issuance to the interface; and
said method further comprising:
generating an IPSec packet;
capturing said packet ID from a header of said IPSec packet; and
checking for said encryption indicia only IPSec packets issued to the said network interface, wherein packets which are not IPSec packets are not checked for said encryption indicia.

14. A computer program product, comprising:
a non-transitory computer readable storage medium; and
program code on said non-transitory computer readable storage medium for dynamically verifying that one or more individual packets being transmitted from a network terminal out to an interface of a network, said program code comprising code for:
a network adapter receiving, from a network adapter driver, a first received packet comprising a packet identifier (ID) including an internet protocol (IP) address;
the network adapter encrypting the first received packet based on an encryption protocol to obtain an encrypted packet comprising the packet ID and an encryption indicia that is an identifier for the encryption protocol;
the network adapter generating a stream of packets, wherein a first packet in the stream of packets comprises the encrypted packet;
prior to the first received packet being received by the network adapter, a network adapter verifier, that is separate from said network adapter, capturing said packet ID;
said network adapter verifier caching said packet ID to obtain a first cached packet ID;
said network adapter transmitting out to an interface of said network, wherein said transmission includes said stream of packets; and
in response to said network adapter transmitting the stream of packets, said network adapter verifier:
monitoring said transmission of the stream of packets out to the interface of said network by the network adapter;
comparing a first packet ID of the first packet in said stream of packets to the first cached packet ID to determine whether there is a match;
in response to first packet ID matching said first cached packet ID, checking said first packet for said encryption indicia; and
in response to a determination that said first packet does not contain said encryption indicia:
halting the transmission of said stream of packets;
discarding one or more subsequent packets in said stream of packets; and
wherein said determination that said first packet does not contain said encryption indicia indicates that the network adapter is not operating correctly.

15. The computer program product of claim 14, further comprising program code for:
generating said first received packet from application data; and
placing said packet ID within a header of said first received packet when said first received packet is created according to said encryption protocol, wherein other packets that are not created according to said encryption protocol are provided with a different identifier-type.

16. The computer program product of claim 14, further comprising program code for:
   tracking a number of occurrences when one or more individual packets issued on said interface did not exhibit said encryption indicia; and
   issuing a signaling alert when said number of occurrences reaches a predetermined threshold.

17. The computer program product of claim 14, wherein:
   said encryption protocol is an Internet Protocol Security (IPSec) protocol;
   said first received packet is an IPSec packet;
   said encryption indicia is a characteristic that identifies when a packet has been encrypted according to the IPSec protocol prior to its issuance to the interface; and
   said program code further comprising code for:
      generating an IPSec packet;
      capturing said packet ID from a header of said IPSec packet; and
      checking for said encryption indicia only IPSec packets issued to the said network interface, wherein packets which are not IPSec packets are not checked for said indicia.

* * * * *